United States Patent [19]

Strahan et al.

[11] 4,390,193
[45] Jun. 28, 1983

[54] ENERGY ABSORBING STEERING WHEEL ASSEMBLY

[75] Inventors: Robert M. Strahan, Dayton; Philip W. Hopf, Centerville, both of Ohio; Phillip G. Williams, Rochester, Mich.

[73] Assignee: General Motors Corporation, Detroit, Mich.

[21] Appl. No.: 166,549

[22] Filed: Jul. 7, 1980

[51] Int. Cl.³ .............................................. B60R 21/02
[52] U.S. Cl. ...................................... 280/777; 74/552; 74/492; 280/750
[58] Field of Search ............... 280/751, 752, 753, 777, 280/750; 74/552, 492; 188/1 C

[56] References Cited

U.S. PATENT DOCUMENTS

| | | | |
|---|---|---|---|
| 3,285,091 | 11/1966 | Fiala | 280/777 X |
| 3,373,629 | 3/1968 | Wight et al. | 280/777 X |
| 3,561,286 | 2/1971 | Edge et al. | 74/552 |
| 3,589,210 | 6/1971 | Norman | 74/552 |
| 3,992,041 | 11/1976 | Verrocchi | 280/250 |
| 4,086,825 | 5/1978 | Badcock et al. | 280/777 X |
| 4,312,430 | 1/1982 | Ohtani | 188/377 |

*Primary Examiner*—Robert R. Song
*Attorney, Agent, or Firm*—Charles R. White

[57] ABSTRACT

A steering wheel assembly for vehicles which incorporates an energy absorbing coupling which mounts the steering wheel for tilting movement with respect to a column to an optimum impact position when the wheel receives inertia load and which provides for subsequent energy management by deformation of a plurality of metallic legs which collapse at controlled rates.

3 Claims, 4 Drawing Figures

ENERGY ABSORBING STEERING WHEEL ASSEMBLY

This invention relates to steering wheel assemblies for vehicles and more particularly to a new and improved energy absorbing coupling operatively mounting a steering wheel to a steering column that permits the steering wheel to be displaced to an optimized inertia load position prior to maximized deflection of the coupling in absorbing impact energy applied to the wheel.

In the preferred embodiment of this invention, a flat type steering wheel, in which spokes thereof extend radially inwardly from an annular outer rim at a slight angle to a centralized hub, is operatively connected to an energy absorbing steering column by a new and improved energy absorbing coupling. This coupling transmits manual steering inputs to a steering shaft in normal operation and is deformable to allow the wheel to pivot from an inclined position to some degree of vertical orientation when initially cushioning an inertia load directed thereto. This latter steering wheel position is optimized insofar as presenting a large impact area for an inertia load. Also, when the steering wheel is in the vertical position, the energy absorbing coupling is set to further deform in a controlled manner to dissipate impact energy directed onto the wheel. The energy absorbing coupling is preferably spider-like in form and has a centralized main body or base from which extends a plurality of arcuately spaced pre-bent and identical legs. With such configuration, the coupling normally operatively holds the steering wheel outwardly from and in alignment with the steering column and the end of the steering shaft therein. The base of the coupling is drivingly connected to the steering shaft while the outer ends of the pre-bent legs are tabbed radially outwardly for secure fastening with the hub of the handwheel. A lower shroud also fastened to the hub to extend downwardly therefrom and around the energy absorbing coupling to provide a casing for the energy absorber and to provide a finely finished appearance. The energy absorbing coupling is preferably made in one piece from yieldable sheet or strip steel and the legs are pre-bent so that they deform in a controlled manner to permit the steering wheel to pivot from a steer position to an optimized inertia load position. The legs are capable of subsequent further deformation and energy absorption as loading to the steering wheel increases. After this deflection of the energy absorbing coupling, the energy absorption capability of the steering column operates to absorb an input energy not otherwise managed by the coupling. With this invention the steering wheel may not be deformed or otherwise damaged when the inertia load effects deformation of the energy absorbing coupling. Repairs are simplified since the deformed coupling can be readily removed from the assembly and replaced by a new undeflected coupling. The original steering wheel can then be reattached to the energy absorbing coupling. Also with this invention, energy absorbing columns may not be stroked so that their replacement would be unnecessary.

An object of this invention is to provide a new and improved steering wheel assembly for vehicles which incorporate an energy absorbing coupling operatively mounting a steering wheel to a steering column which provides for the limited pivotal displacement of the steering wheel from a steering position to an optimum inertia load position when the wheel initially receives a predetermined inertia load and which subsequently provides for effective energy management of additional inertia load by the compressive deformation of the energy absorbing coupling.

Another feature, object and advantage of this invention is to provide a new and improved coupling for operatively connecting a steering wheel to an energy absorbing steering column which comprises a one piece, spider-like energy absorber having deformable legs that provide an independent degree of extension and buckling so that the steering wheel coupled thereto when sufficiently loaded will be rotated from an initial inclined position to a somewhat vertical position to maximize load area and to evenly transmit loads to the energy absorbing coupling which in turn buckles to dissipate the load energy.

Another feature, object and advantage of this invention is to provide a new and improved steering wheel and energy absorbing coupling mounted to a steering column in which the coupling (1) initially deforms and guides the steering wheel from a steering position to an optimized inertia load position on receipt of impact loads applied to a portion of the steering wheel, and (2) subsequently buckles under continued compressive loads applied through the steering wheel to dissipate impact energy.

These and other features, objects and advantages of this invention will be more apparent from the following detailed description and drawing in which.

Figure 1:
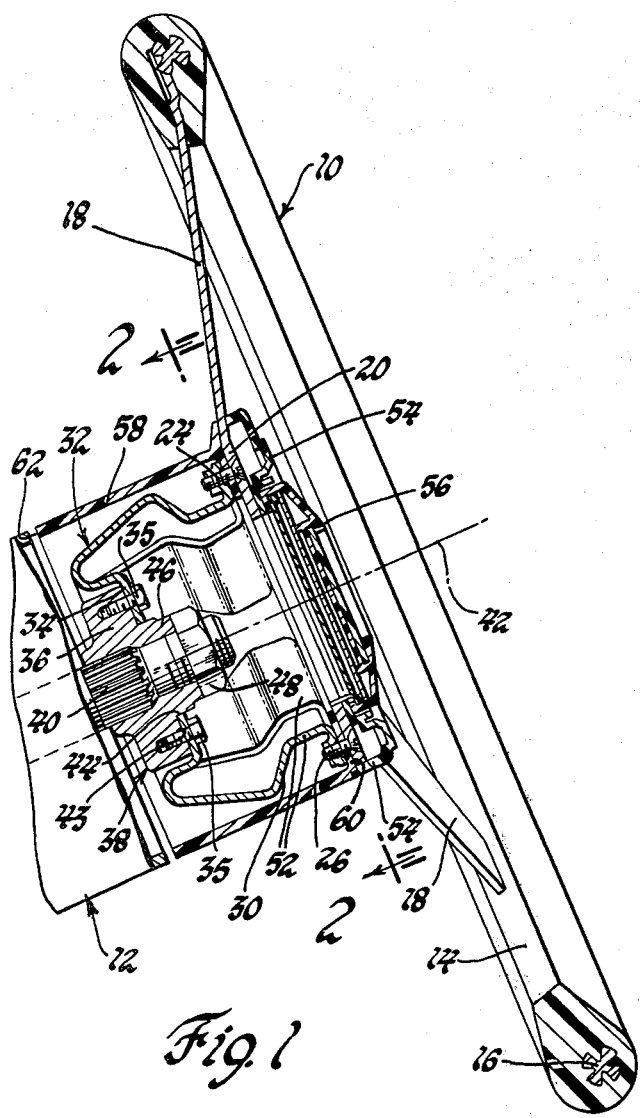
FIG. 1 is a side view, partially in section, of a steering wheel and column assembly taken generally along lines 1—1 of FIG. 2.
Figure 2:
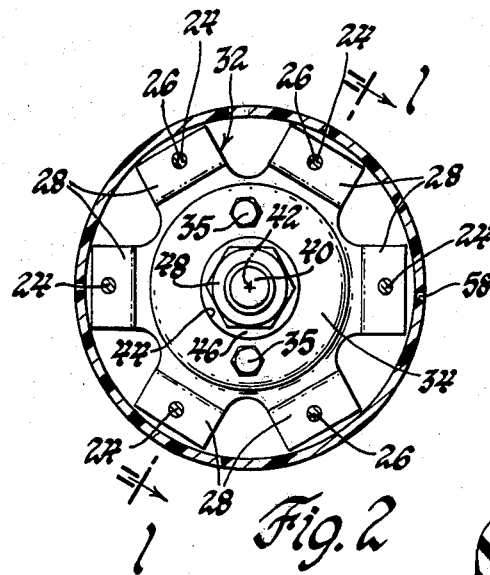
FIG. 2 is a cross-sectional view taken generally along lines 2—2 of FIG. 1.
Figure 3:
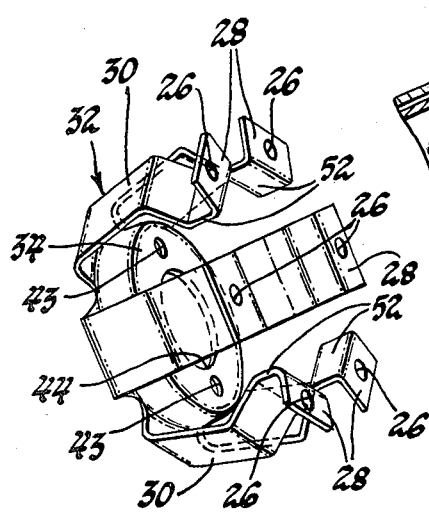
FIG. 3 is a perspective view of the energy absorbing coupling of this invention for operatively mounting a steering wheel to a column.

Turning now in greater detail to the drawing, FIG. 1 illustrates a steering wheel assembly 10 operatively connected to an energy absorbing steering column 12 mounted in a vehicle as disclosed in U.S. Pat. No. 3,392,599 issued July 16, 1968, hereby incorporated by reference. The steering wheel assembly 10 incorporates a structurally rigid outer rim 14 having a circular inner core 16 to which are fixed the ends of a plurality of radial and arcuately spaced spokes 18. These spokes are substantially rigid members whose inner ends terminate in an annular centralized hub 20 flat and formed with an annular arrangement of openings through which threaded fasteners 24 extend. These fasteners are threaded into holes 26 tapped into the outwardly radiating feet 28 of arcuately spaced and upwardly extending legs 30 of an energy absorbing coupling 32 that operatively mounts the steering wheel assembly 10 to the steering column 12.

The energy absorbing coupling 32 is generally spider-like in formation, having a cupped main body or base 34 that is seated upon and, by screws 35, fastened to the cylindrical shoulder 36 of a connector 38 splined or otherwise secured to an elongated steering shaft 40 that extends along an inclined steering axis 42. The base 34 of the energy absorbing coupling has a central opening 44 through which a cylindrical neck portion 46 of the connector 38 extends. The end of the steering shaft 40 extends through the connector 38 and is threaded to receive a nut 48 that holds the connector 38 in splined engagement with shaft 40.

The legs 30 of the energy absorbing coupling 32 are reversely curved from connection with the base 34 so that they extend upwardly and axially outwardly from the upper end of the steering shaft 40 and the connector 38 in an annular pattern surrounding the steering shaft axis 42. As shown, the threaded fasteners 35 extend through appropriate openings 43 in the base 34 of the energy absorbing coupling into tapped openings formed in the cylindrical shoulder 36 to thereby secure the coupling to the connector so that rotational steering input to the rim 14 will effect the rotation of the steering shaft 40. Each of the legs 30 of the energy absorbing coupling is pre-bent inwardly at 52 adjacent to the associated foot portion 28 thereof to provide bending zones for control of steering wheel movement in the event of the inertia loading thereof exceeding that of predetermined magnitude.

A ring-like upper plastic shroud 54 fits over the annular hub of the steering wheel and cooperates with a center disc-like cap 56 suitably retained therein to provide a removable access cover and a final finished appearance for the center of the steering wheel 10.

In addition to the upper shroud 54, the wheel assembly has a plastic lower cylindrical shroud 58 formed with an upper flange 60 sandwiched between the steering wheel hub 20 and the upper surface of the feet 28 of the energy absorbing coupling. The fasteners 24 extend through openings in this flange to securely attach the lower shroud to the energy absorbing coupling and the steering wheel. From the flange, the lower shroud extends downwardly around the energy absorbing coupling 32 to a terminal edge 62 adjacent to the upper end of the steering column. This lower shroud thus houses the energy absorbing coupling and provides a finally finished appearance to the steering column and wheel assembly.

The steering column 12 preferably has an impact energy absorbing function complimentary to that of the energy absorbing coupling 32. To this end the energy absorbing construction of the steering column 12 is similar to that of the above-referenced U.S. Pat. No. 3,392,599 and includes steel bearing balls 66 operatively disposed between the telescoping upper and lower mast jacket cylinders 68 and 70 surrounding the steering shaft and respectively mounted to the steering shaft connector 38 and the front bulkhead of the associated vehicle not illustrated. The steering shaft also has telescoping shaft sections 72 and 74 releasably held in a normal operating relationship by plurality of injection molded plastic sheer pin 76 subject to fracture under predetermined axial load.

Figure 4:
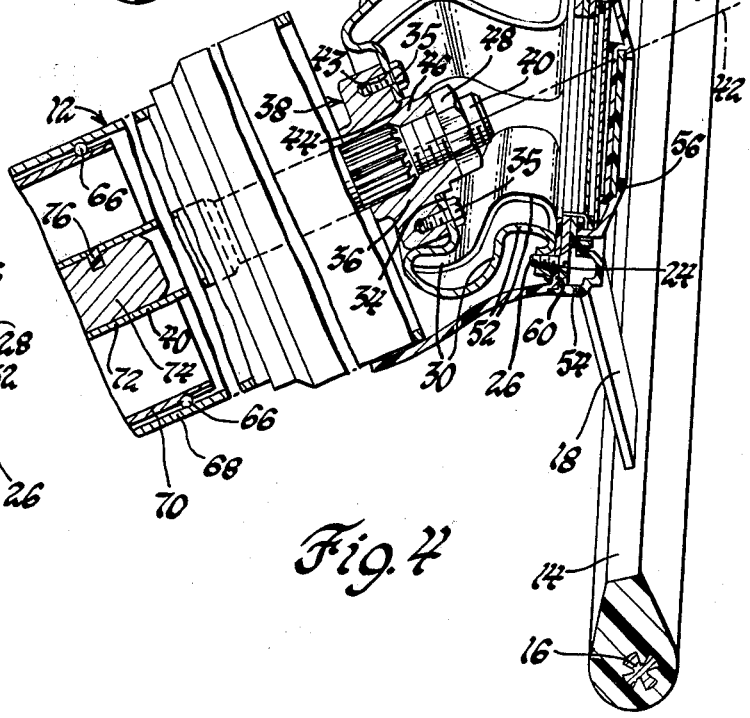
FIG. 4 is a side view showing partial deformation of the energy absorbing coupling of this invention for the pivotal displacement of the steering wheel from the FIG. 1 position to some degree of vertical inclination.

In the event that an inertia load, exceeding that of a predetermined magnitude, is directed to a lower portion of the steering wheel rim, the steering wheel will be rotated from the FIG. 1 position without damage. This rotation will be in a clockwise direction and the wheel will be displaced from the inclined FIG. 1 position to a somewhat vertical orientation shown in FIG. 4. The inertia forces compressably load and buckle the lower legs of the energy absorbing coupling as the upper legs are stressed and elongated as shown in FIG. 4. The radial spokes of the steering wheel being rather stiff do not appreciably deflect as the steering wheel moves to the FIG. 4 position in which the larger surface of the wheel is presented for load spreading.

With a larger steering wheel area available, the load is spread to a greater portion of the rim and the legs of the energy absorbing coupling are all subsequently compressably loaded and collapsed. When fully collapsed, remaining inertia energy, if any, will be effectively dissipated by the telescoping of the steering column components and the steering shaft. Thus, in FIG. 4 the steel balls, exemplified by element 66, will effect the deformation of the metal of the telescoping mast jacket cylinder to absorb the energy effecting such motion. With this invention repair is facilitated if the steering wheel 10 is not damaged when the energy absorbing coupling is stroked, and this latter component can be readily removed for quick replacement by a new energy absorbing coupling. To this end the outer shroud 54 and cap 56 can be snapped off the steering wheel hub to provide access to fasteners 35. When fasteners 35 are removed, the steering wheel and the energy absorbing coupling can be removed as a unit.

While the energy absorbing coupling of this invention is preferably a one-pieced stamping of the steel and each leg is configured to provide a specific degree of deformation, the coupling could be a multi-part member and the legs could have varying configuration to tailor the energy absorbing characteristics of the steering wheel so that action would be different than that described in the preferred embodiment of this invention.

While a preferred embodiment has been shown and described for illustrating this invention, other embodiments employing the concepts and ideas of this invention may be adopted by those skilled in the art such as falls within the scope of the appended claims.

The embodiments of the invention in which an exclusive property or privilege is claimed are defined as follows:

1. A steering wheel operatively interconnected to a rotatable steering shaft of a steering column and thereby being disposed at a predetermined position in a vehicle, said steering wheel comprising an outer rim and an inner hub interconnected to one another by a plurality of spokes which space said rim outwardly of said hub, an energy absorbing coupling operatively connected to an end portion of said steering shaft for yieldably supporting said steering wheel axially outwardly from the end of said steering shaft, said energy absorbing coupling being of a plastically deformable material having an annular base drivingly connected to said steering shaft and having a plurality of arcuately spaced and separate energy-absorbing legs extending upwardly from said base and surrounding the longitudinal steering axis of said steering shaft, each of said legs having a radial and inwardly extending bend therein located at a predetermined distance above said base and terminating in an outwardly extending foot portion, fastener means connecting each said foot portion to said inner hub of said steering wheel such that an inertia force of at least a predetermined magnitude directed to a lower portion of said rim will compressively load and buckle said legs of a corresponding lower portion of said coupling while tensioning said legs of an upper portion of said coupling to thereby turn said steering wheel on an axis transverse to said steering axis and from said predetermined position to a second position angularly disposed with respect to said predetermined position so that additional portions of said rim will receive said force for transmission to and subsequent compressive deformation of all of said legs for energy dissipation.

2. A steering wheel and energy absorbing coupling assembly for interconnection to a rotatable steering shaft of a motor vehicle comprising an outer rim and an inner hub interconnected to one another by a plurality of spokes which space said rim axially outwardly from said hub, said energy absorbing coupling operatively interconnecting said hub to an end portion of said steering shaft so that said steering wheel is disposed in a predetermined angular plane, said energy absorbing coupling being formed from plastically deformable metal having a radially extending base drivingly secured to an upper end portion of said steering shaft, said coupling having a plurality of separate energy absorbing legs extending from said base, each of said legs being prebent radially inwardly at a predetermined distance from said base and each terminating in a radially extending outer end, fastener means connecting the outer end of each of said legs to said hub of said steering wheel so that said steering wheel can be manually turned to turn said steering shaft and so that a force of at least a predetermined magnitude applied to a lower portion of said rim compressively load and buckle some of said legs on a corresponding lower portion of said coupling and stretch some of said legs on the upper portion of said coupling so that said steering wheel will be displaced from said predetermined angular plane to a different and upwardly extending plane without substantial deformation of said spokes of said steering wheel so that additional portions of said rim will receive and transmit said force for subsequent compressive deformation of said legs for energy dissipation.

3. A steering wheel arranged for interconnection by an energy absorbing coupling to a rotatable steering shaft of a motor vehicle consisting of an outer handwheel and an inner hub member interconnected to one another by a plurality of spokes which space said handwheel radially outwardly from said hub member, said energy absorbing coupling operatively connecting said hub member axially outwardly of an upper end of said steering shaft characterized in that said coupling is a plastically deformable metallic unit having a base portion secured to an upper end of said steering shaft and having a plurality of separate and substantially identical energy absorbing legs arcuately spaced from one another that surround the axis of said steering shaft and extend upwardly from said base portion for secure connection at their outer ends to said inner hub member, each of said legs being prebent inwardly such that a force of at least a predetermined magnitude applied to a lower portion of said handwheel will compressively load and buckle some of said legs on the lower part of said coupling and elongate some of said legs on an upper part of said coupling by tension load so that said handwheel will pivot into a position transverse to said force without substantial distortion of said spokes allowing additional portions of said handwheel to receive and transmit said force and allowing said legs of said coupling to bend radially inwardly to dissipate the energy of said force.

* * * * *